United States Patent [19]

Usui et al.

[11] Patent Number: 4,477,854
[45] Date of Patent: Oct. 16, 1984

[54] PORTECTIVE RELAY WITH SECOND HARMONIC SUPPRESSION

[75] Inventors: Masaji Usui; Akiyoshi Honma, both of Hyogo, Japan

[73] Assignee: Mitsubishi Denki Kabushiki Kaisha, Tokyo, Japan

[21] Appl. No.: 501,085

[22] Filed: Jun. 6, 1983

[30] Foreign Application Priority Data

Jun. 23, 1982 [JP] Japan .................................. 57-109205
Jun. 23, 1982 [JP] Japan .................................. 57-109206

[51] Int. Cl.³ .......................................... H02H 7/045
[52] U.S. Cl. ....................................... 361/36; 361/87; 361/113
[58] Field of Search .................... 361/36, 87, 35, 78, 361/85, 86, 113; 324/55

[56] References Cited

U.S. PATENT DOCUMENTS 3,323,016 5/1967 Andersson ........................ 361/36
4,204,237 5/1980 Zocholl ............................ 361/36
4,402,028 8/1983 Udren ............................. 361/87 X

FOREIGN PATENT DOCUMENTS 83097 7/1983 European Pat. Off. .
142545 6/1979 Japan ................................ 361/36
698097 11/1979 U.S.S.R. ........................... 361/36

OTHER PUBLICATIONS

Westinghouse I.L. 41-347.1H—Types HU and HU-1 Transformer Differential Relays.
ASEA Catalogue RK 62-10 E—Transformer Differential Relay Type RADSE.
General Electric Company Limited Bulletin "GEC Measurements".

Primary Examiner—Patrick R. Salce
Attorney, Agent, or Firm—Bernard, Rothwell & Brown

[57] ABSTRACT

A relay adapted for protection of a transformer and capable of functioning with certainty upon occurrence of any internal fault in the transformer but not functioning in the case of an inrush current which flows therein at the time of non-load energization or the like. The relay comprises a ratio differential element for comparing the amount of a suppression current with that of a differential current flowing in the transformer, an element for detecting the content proportion of a second harmonic component in the differential current, a monostable multivibrator for sending an output of a fixed pulse width at the moment of detection of the differential current, an AND circuit for producing an output in accordance with the logical product condition relative to the output of the second-harmonic detection element and that of the monostable multivibrator, a timing circuit for producing an output when the output of the second-harmonic detection element continues for a predetermined period of time, and gate means for suppressing the output of the ratio differential element when either the output of the AND circuit or that of the timing circuit is being fed thereto.

8 Claims, 9 Drawing Figures

PORTECTIVE RELAY WITH SECOND HARMONIC SUPPRESSION

BACKGROUND OF THE INVENTION

1. Field of the Invention

The present invention relates to a protective relay designed to protect a transformer which is an essential component device in a power system, and more particularly to an improved relay equipped with a second harmonic suppressor for preventing a malfunction that may be induced by a second harmonic generated at the time of inrush or the like.

2. Description of the Prior Art

FIG. 1 is a block diagram of a conventional relay of this type known heretofore, wherein there are shown a suppression input terminal 1; a differential input terminal 2; a suppression circuit 3; a differential circuit 4; a first comparator circuit 5; a ratio differential element consisting of the said suppression circuit 3, differential circuit 4 and first comparator circuit 5; a fundamental-wave extraction circuit 7; a second-harmonic extraction circuit 8; a second comparator circuit 9; a second-harmonic detection element consisting of the said fundamental-wave extraction circuit 7, second-harmonic extraction circuit 8 and second comparator circuit 9; an AND circuit 11 which serves to provide the output of the ratio differential element 6 only when the output of the second-harmonic detection element 10 is not received; and an output terminal 12.

There are also shown in FIG. 1 a differential input I1, an output a of the ratio differential element 6, a fundamental wave I2 in the differential input, a second harmonic I3 in the differential input, an output b of the second-harmonic detection element, and a final output c. The respective waveforms thereof are illustrated in FIGS. 2 and 3, wherein the amounts of AC components are represented by dotted lines while the amounts of rectified current components are represented by solid lines.

The operation of such a conventional relay will now be described with reference to FIGS. 2 and 3.

The waveform chart of FIG. 2 relates to an exemplary case where an inrush current of a transformer flows as a differential input. An inrush current is generated upon energization of the transformer without any load is therefore not a fault current, so that the protective relay associated therewith should not function in response to such an inrush current. Since a considerable amount of second harmonic component is normally contained in the inrush current, it is generally customary to employ a system of suppressing the output by detecting the content of the second harmonic component. The device of FIG. 1 also adopts such output suppression system. As illustrated in FIG. 2, the output a of the ratio differential element 6 is active when the differential input is above a predetermined value, while the output b of the second-harmonic detection element 10 is active when the ratio between the second harmonic I3 and the fundamental wave I2 is high. Therefore, the output c of the AND circuit 11 is not provided due to the fact that the output condition of the AND circuit 11 is not satisfied because of the presence of the output b, although the output c rises as represented by a dotted line in case the output b is absent.

The waveform chart of FIG. 3 relates to another exemplary case where a differential current is generated as a result of an internal fault, showing that a fundamental wave I2 is generated when a fundamental-frequency current flows as a differential current I1 at time t1. In general, the fundamental wave I2 is delayed in its rise due to a filter employed in the fundamental-wave extraction circuit 7 and therefore increases gradually as illustrated. Considering that the input is composed essentially of the fundamental wave I2 alone, the second harmonic output I3 is not to be generated. However, since the second-harmonic extraction circuit 8 also incorporates a filter whose characteristic is usually more acute than that of the fundamental-wave extraction circuit 7, the output I3 comes to present steep increase and gradual decrease eventually because of the transient phenomenon derived from the input variation. It follows that the output a of the ratio differential element 6 becomes active when the differential input is above a predetermined value, but the output c of the AND circuit 11 is delayed in its rise as the output b of the second-harmonic detection element 10 obtained in relation to such second harmonic output I3 is sent for a fixed period of time in the initial stage. This is based on the reason that the operation time is prolonged by the second-harmonic detection element 10.

An explanation will now be given with regard to an instance where the differential current is suddenly reduced at time t2 in the waveform chart of FIG. 3. When there occurs a sudden reduction in the differential current I1 at time t2 within the operating zone of the ratio differential element 6, the output is supposed to be sent continuously since the shift of a fault point is included within the operating zone. However, the second harmonic output I3 varies to present a mountain-shaped waveform while being affected by the transient phenomenon in the second-harmonic extraction circuit 8 derived from the input variation, and in case the ratio between the second harmonic output I3 and the fundamental wave I2 is greater than a predetermined value, the output b of the second harmonic detection element 10 comes to rise, whereby the output c of the AND circuit 11 is temporarily interrupted. The above-described shift of the differential current within the operating zone of the ratio differential element 6 occurs upon generation of a system fault during inspection of the protective relay with application of a checking current, or at the time of removing the checking current posterior thereto. (The checking current should be removed for interruption of the inspection during which the action of the protective relay fails to provide an effective output for energizing the coil of a breaker.) Thus, there has been a disadvantage heretofore that the occurrence of such current shift renders setting of the inspection sequence difficult.

SUMMARY OF THE INVENTION

It is an object of this invention to provide an improved protective relay with second harmonic suppression wherein, when a differential input is suddenly reduced within the operating zone of a ratio differential element which compares a suppression input with the differential input, a second harmonic component due to transient phenomenon is not utilized as a suppression signal so that the output of the ratio differential element can be sent continuously without interruption.

The protective relay according to the present invention comprises a ratio differential element for comparing a suppression input with a differential input, a second-harmonic detection element for comparing the second harmonic component with the fundamental wave component contained in the differential input, a timing circuit for producing its output when the output duration of the second-harmonic detection element exceeds a predetermined period of time, a monostable multivibrator for sending an output merely during a fixed period of time posterior to the monent of detection of the differential input, a first AND circuit receptive of the outputs of the monostable multivibrator and the second-harmonic detection element, an OR circuit receptive of the outputs of the first AND circuit and the timing circuit, and a second AND circuit receptive of the outputs of the OR circuit and the ratio differential element.

DETAILED DESCRIPTION OF THE PREFERRED EMBODIMENTS

Figure 1:
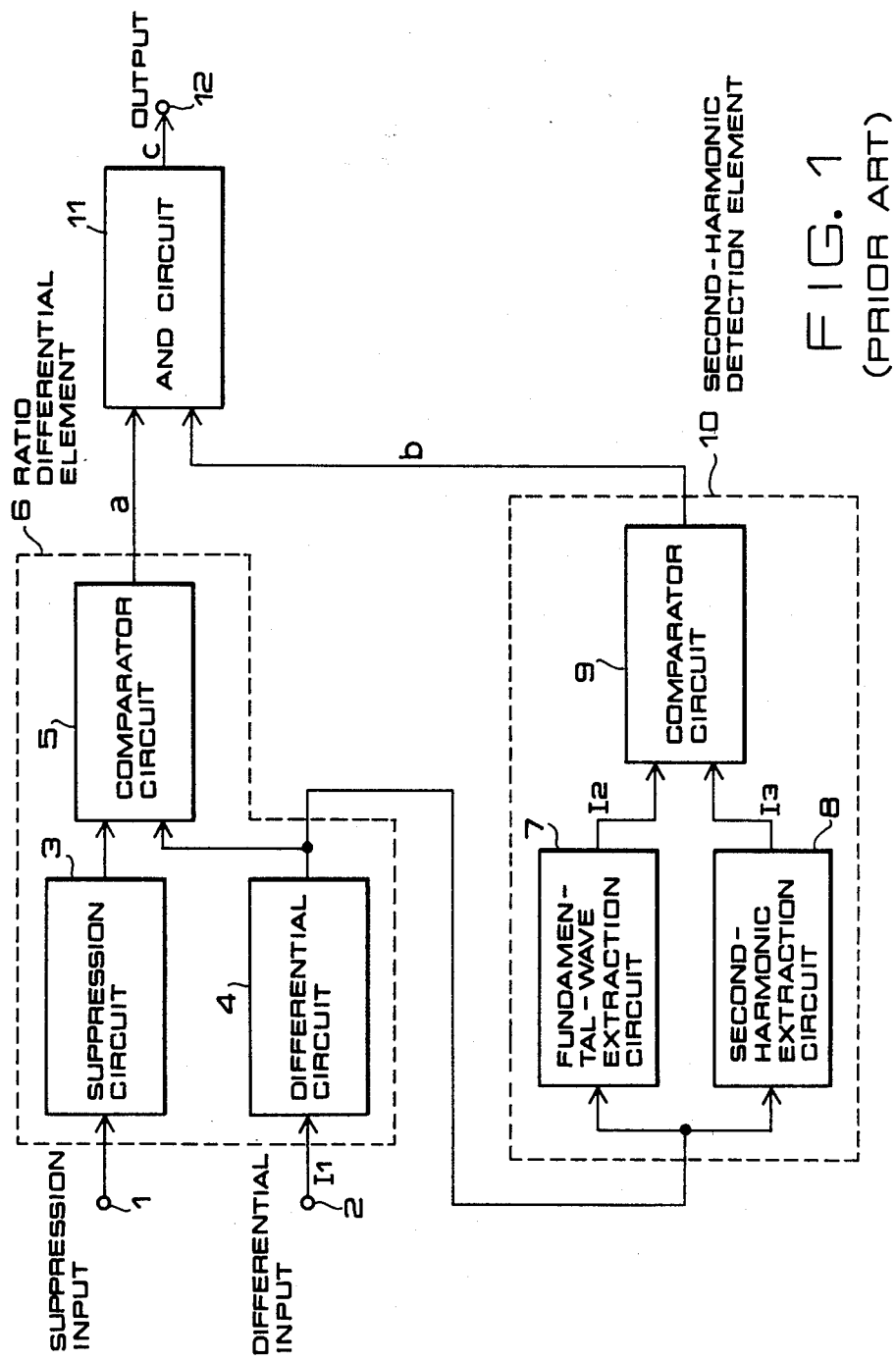
FIG. 1 is a block diagram of a conventional protective relay with second harmonic suppression.
Figure 4:
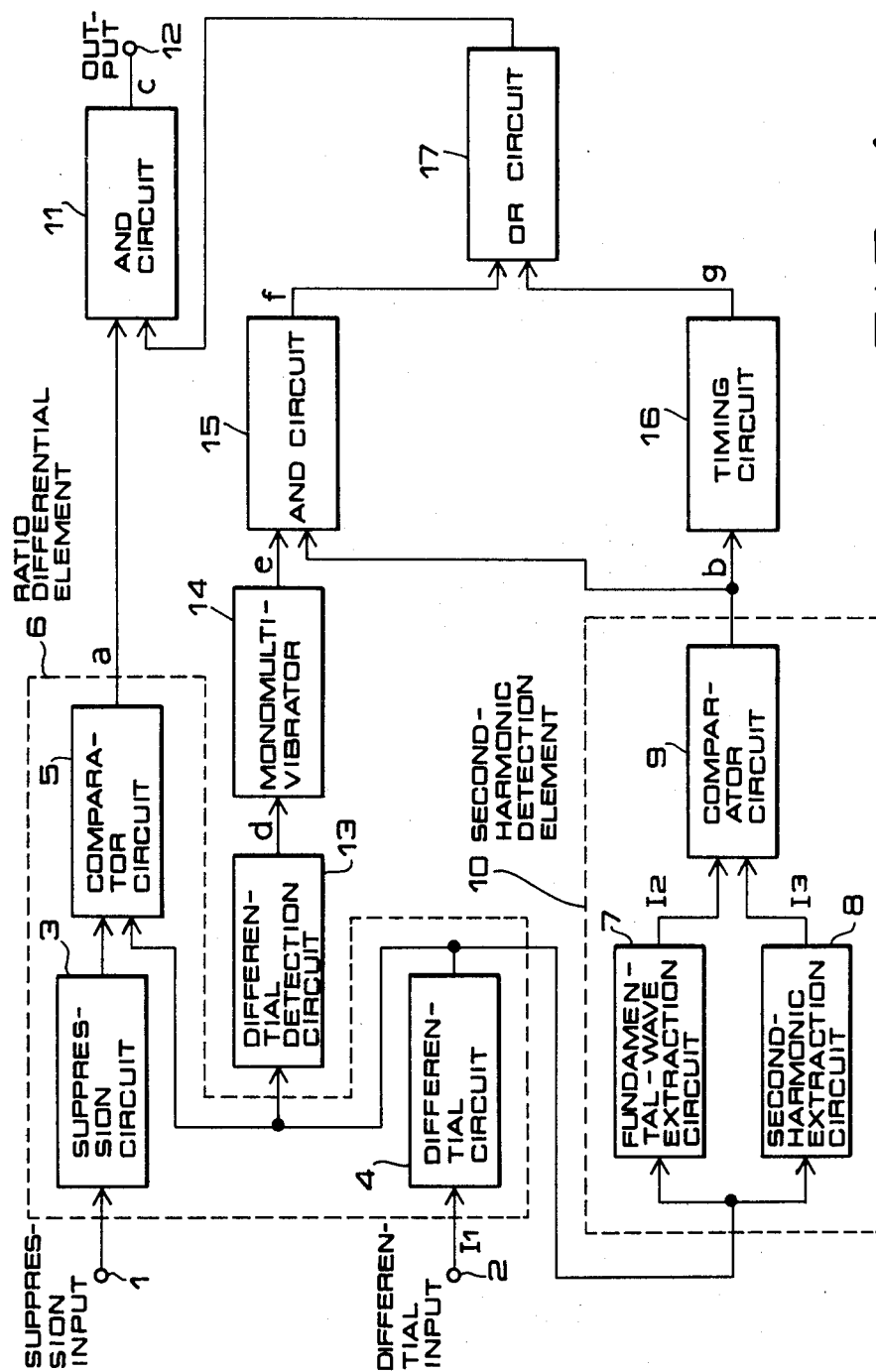
FIG. 4 is a block diagram of an exemplary protective relay with second harmonic suppression embodying the present invention.

In the block diagram of FIG. 4 relative to an exemplary embodiment of the protective relay with second harmonic suppression according to the present invention, there are shown a suppression input terminal 1, a differential input terminal 2, a suppression circuit 3, a differential circuit 4, a first comparator circuit 5, a ratio differential element 6, a fundamental-wave extraction circuit 7, a second-harmonic extraction circuit 8, a second comparator circuit 9, a second-harmonic detection circuit 10, an AND circuit 11, and an output terminal 12. Since such components are basically equal in both structure and function to those shown previously in FIG. 1, the corresponding parts are represented by the same reference numerals, and detailed description therefor is omitted here.

There are further shown in FIG. 4 a differential detection circuit 13 connected to the output terminal of the differential circuit 4 and serving to detect the amount of a differential current from the output of the differential circuit 4; a monostable multivibrator 14 inverted in response to the output of the differential circuit 4 and reset, after being held in the inverted state for a predetermined period of time, to the former state thereof while sending its output during such inverted state; a two-input AND circuit 15 receptive of the outputs of the monostable multivibrator 14 and the second comparator circuit 9 fed thereto; a timing circuit 16 having a function of sending its output when the output of the comparator circuit 9 continues for more than a preset period of time; and an OR circuit 17 to which the outputs of both the AND circuit 15 and the timing circuit 16 are fed. The AND circuit 11 receives the respective outputs, of the OR circuit 17 and the first comparator circuit 5, and sends its output to the terminal 12 when the logical sum condition is satisfied with respect to the two outputs received.

Figure 5:
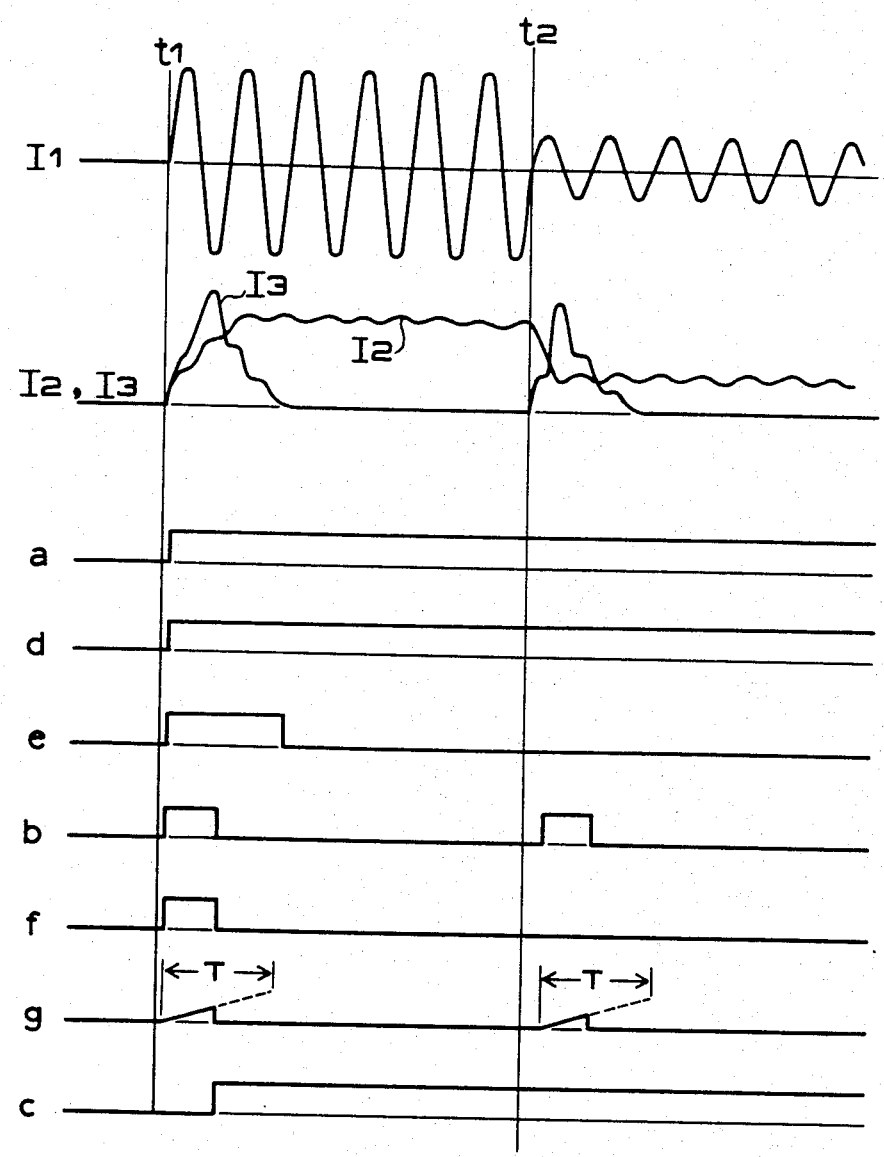
FIGS. 5 and 6 are waveform charts of signals obtained in the individual parts of the protective relay shown in FIG. 4.
Figure 6:
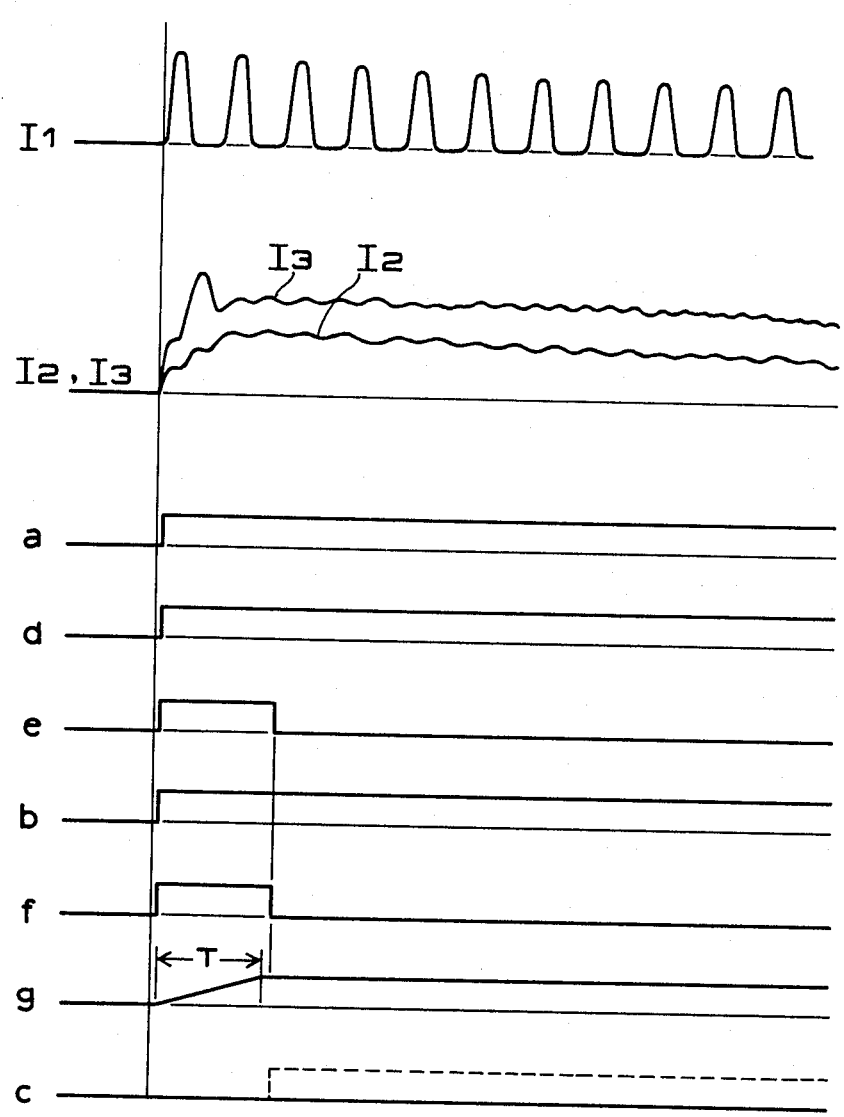

FIGS. 5 and 6 illustrate the waveforms of signals denoted by I1, I2, I3 and a through g in FIG. 4.

Figure 3:
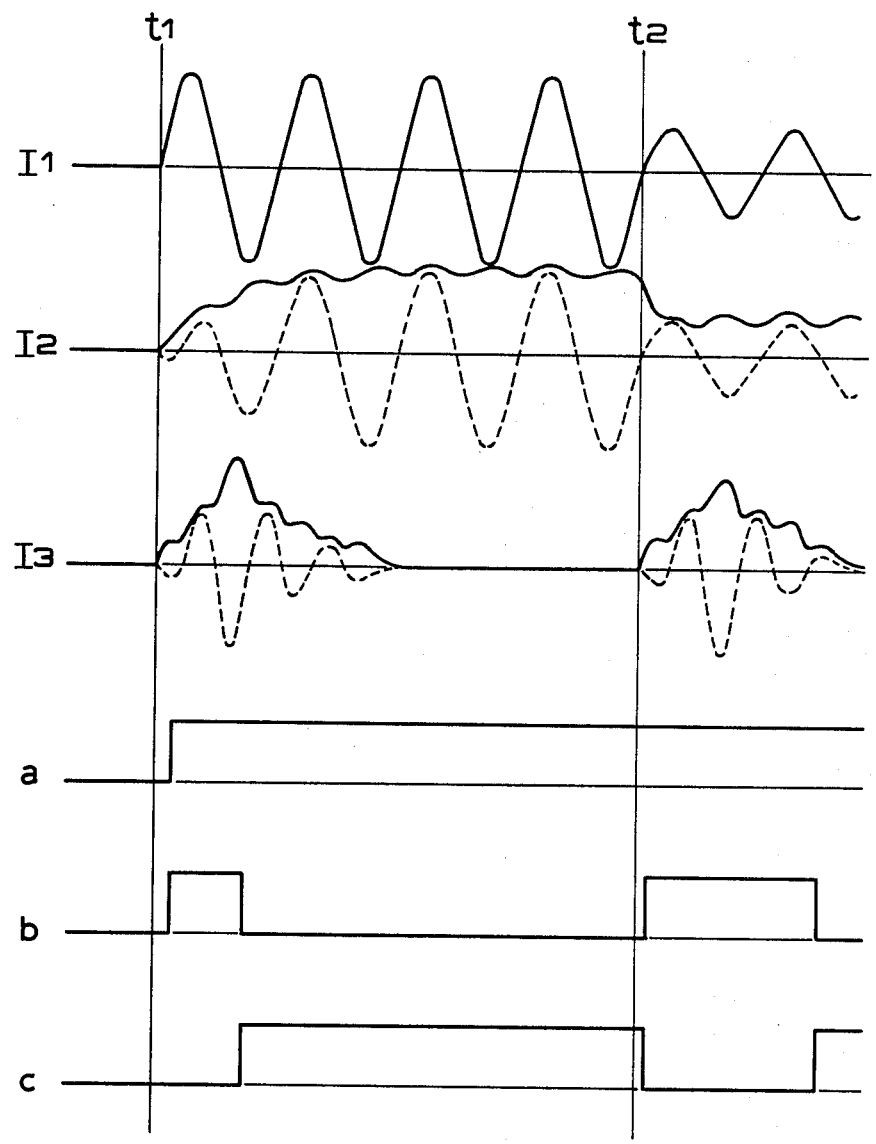

The operation of the protective relay shown in FIG. 4 will now be described below. In FIG. 5, the waveforms a and b are equal to those mentioned previously in connection with FIG. 3. When a differential current I1 flows at time t1, the output d of the differential detection circuit 13 is sent to actuate the monostable multivibrator 14, which then produces its output e for a predetermined period of time so that the second AND circuit 15 provides an output f to suppress the output b of the second-harmonic detection element 10. Accordingly, the output c of the first AND circuit 11 is produced with a time delay in the same manner as explained previously in connection with FIG. 3. In this case, the timing circuit 16 sends no output at all since the output duration of the second-harmonic detection element 10 has not reached the predetermined time period T.

In an instance where the differential current I1 is reduced suddenly at time t2 within the operating zone of the ratio differential element 6, the output d of the differential detection circuit 13 is produced continuously since the operating zone of this circuit is generally wider than that of the ratio differential element 6, so that the monostable multivibrator 14 sends no output at all and thereby prohibits rise of the output f of the second AND circuit 15. Consequently, differing from the foregoing case of FIG. 3, the output b of the second-harmonic detection element 10 fails to become a signal which suppresses the output of the first AND circuit 11. In this stage, the timing circuit 16 serves to clock the output b of the second-harmonic detection element 10 but does not send its output g as the duration of the output b has not reached the predetermined time period T.

Accordingly, the output c of the first AND circuit 11 is not interrupted at or immediately after time t2.

Figure 2:
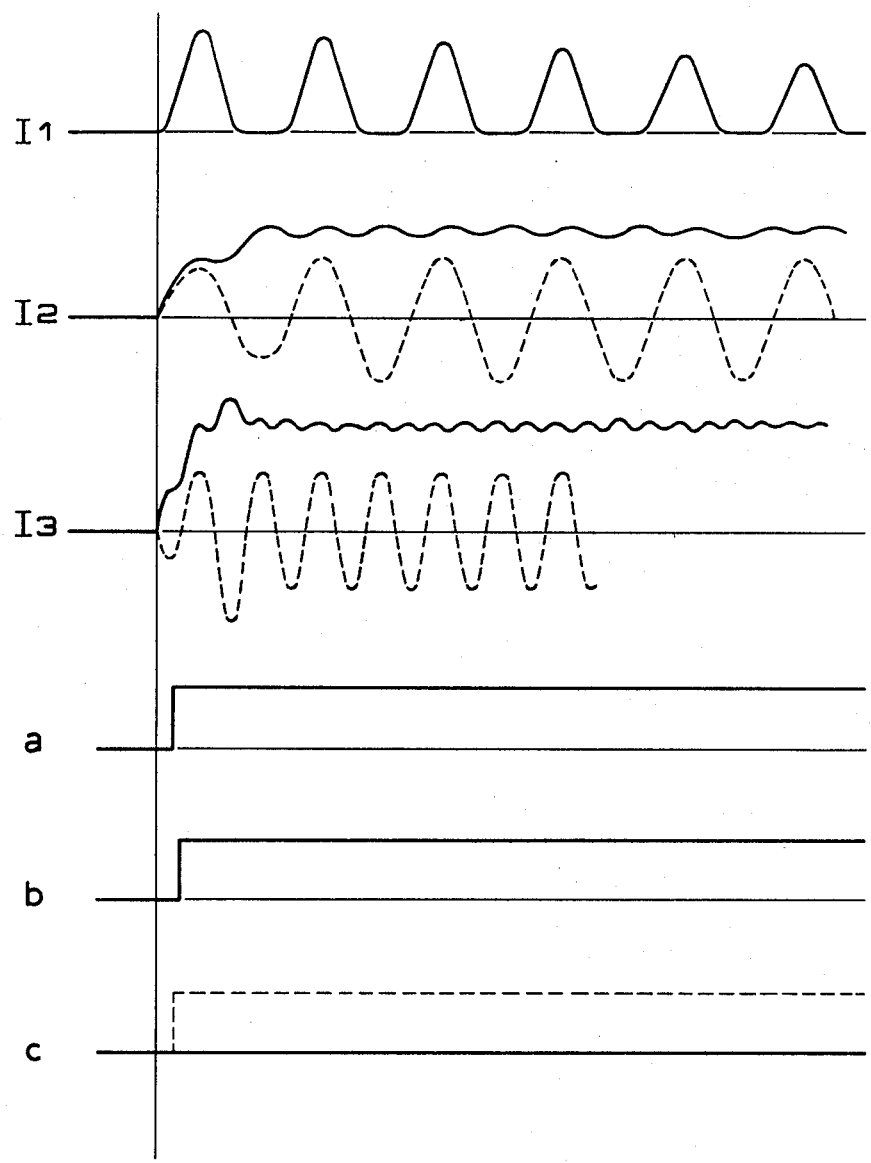
FIGS. 2 and 3 are waveform charts of signals obtained in the individual parts of the protective relay shown in FIG. 1.

In the waveform chart of FIG. 6 relative to an instance where the input current I1 is a transformer inrush current, the output a of the ratio differential element 6 and the output b of the second-harmonic detection element 10 are the same as those described in connection with FIG. 2. As the ratio differential element 6 is sending its output a in this case, the differential detection circuit 13 produces an output d, so that the monostable multivibrator 14 sends its pulse output e of a fixed width. Then the second AND circuit 15 takes a logical product of the output b of the second-harmonic detection element 10 and the output e of the monostable multivibrator 14 to produce an output f which suppresses the output of the first AND circuit 11. In such a state, the output c of the first AND circuit 11 is on the verge of rising as represented by a dotted line in conformity with the fall of the output f but is actually prohibited from rising by the output g of the timing circuit 16 which clocks the output duration of the second-harmonic detection element 10 and sends such output g after the lapse of a predetermined time period T. Thus, in the above-described embodiment of the present invention, no malfunction is performed when the transformer inrush current is inputted.

It is necessary to set the clock time period T of the timing circuit 16 to a proper value longer than the output duration of the second-harmonic detection element 10 (determined by the circuit constant of the element 10 and the amount of an input variation) in the case of any sudden reduction of the differential input but shorter than the output pulse width of the monostable multivibrator 14. The time period T is settable to any desired length if the said output pulse width of the monostable multivibrator 14 is longer than the output duration of the second-harmonic detection element 10 at the sudden occurrence of a reduction in the differential input.

Figure 7:
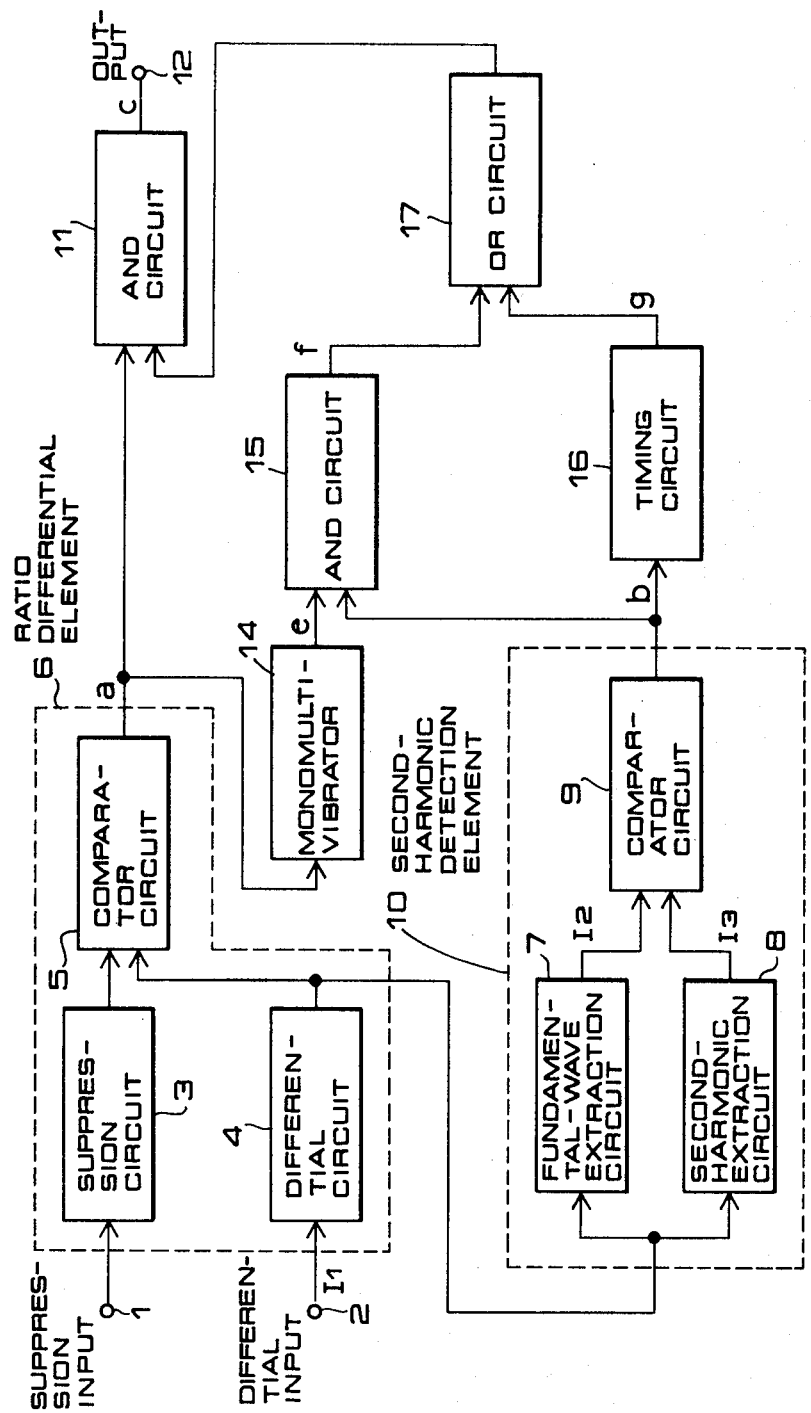
FIG. 7 is a block diagram of another exemplary protective relay with second harmonic suppression embodying the invention.

In FIG. 7 showing a block diagram of another exemplary protective relay with second harmonic suppression embodying the present invention, the components corresponding or equivalent to those in FIG. 4 are represented by the same reference numerals. In this embodiment, the differential detection circuit 13 employed in the foregoing example of FIG. 4 is omitted, and the monostable multivibrator 14 is furnished with the output signal a of the first comparator circuit 5.

Figure 8:
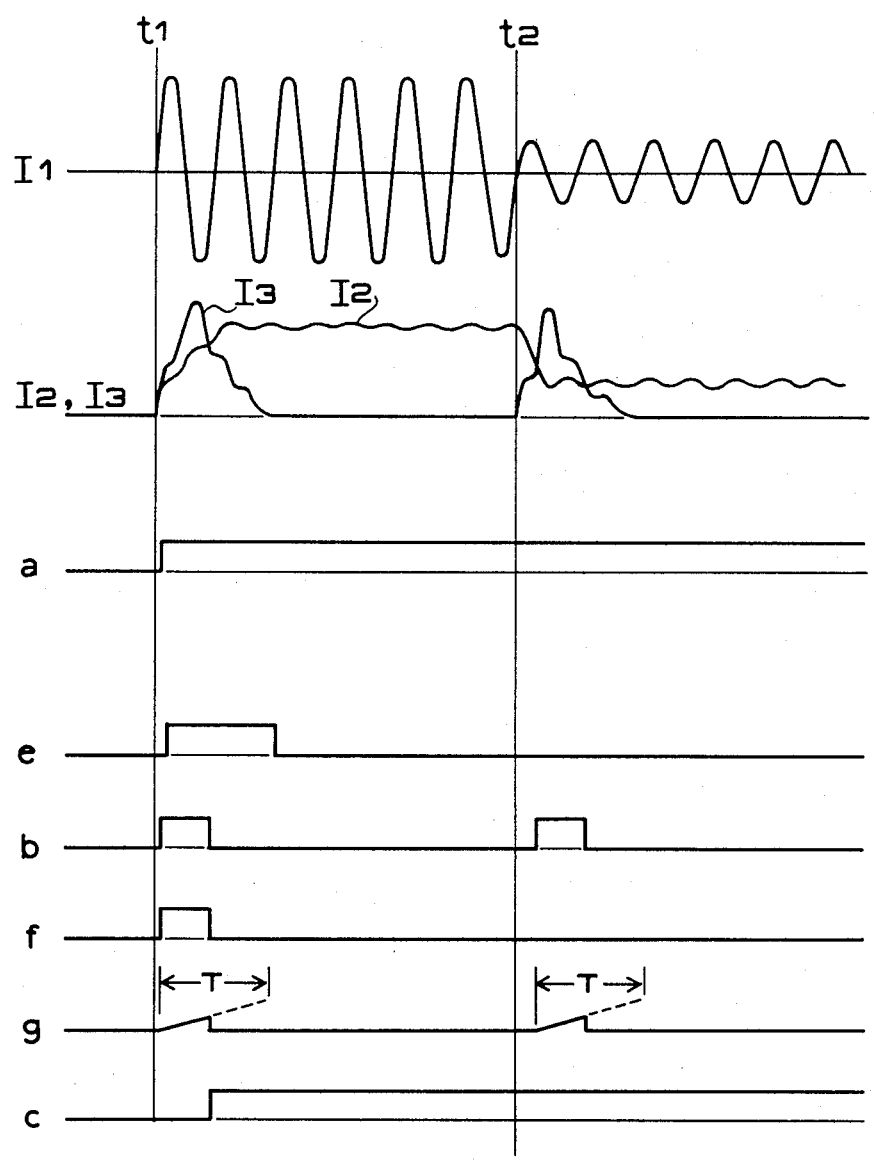
FIGS. 8 and 9 are waveform charts of signals obtained in the individual parts of the protective relay shown in FIG. 7.

Referring to FIG. 8 which illustrates the waveforms of signals obtained in the individual parts of the relay, when a differential current I1 flows at time t1, the ratio differential element 6 produces an output a to actuate the monostab,le multivibrator 14, which then sends its output e for a predetermined period of time. During this period, the logical product condition is satisfied with respect to the output e of the monostable multivibrator 14 and the output b of the second-harmonic detection element 10, so that the AND circuit 15 comes to send its output f. Consequently, as in the foregoing example shown in FIG. 3, the output c of the AND circuit 11 is sent with a predetermined delay from time t1. In this case, however, the timing circuit 16 is prohibited from providing its output since the output b of the second-harmonic detection element 10 has a duration shorter than the preset time period T.

Supposing now that the differential current I1 is suddenly reduced at time t1 within the operating zone of the ratio differential element 6, the output a thereof is sent continuously so that no output is produced from the monostable multivibrator 14. Accordingly, the output e of the AND circuit 15 is not induced to rise and, differing from the foregoing case of FIG. 3, the output b of the second-harmonic detection element 10 does not serve to suppress the output of the AND circuit 11. In this case, although the timing circuit 16 clocks the duration of the output b, its output f is not sent due to the fact that the clocked duration is shorter than the preset time period T. As a result, there occurs no interruption in the output c of the AND circuit 11 at time t2.

Figure 9:
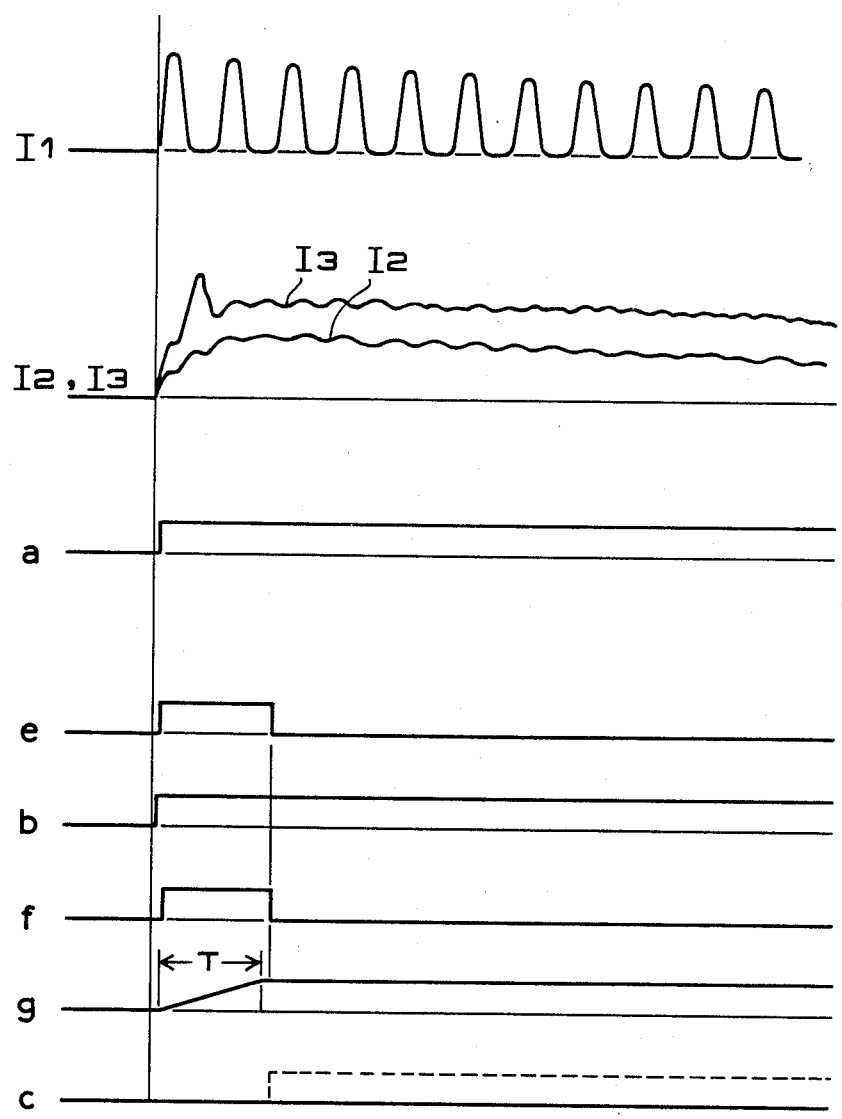

Meanwhile, in case the input current I1 is a transformer inrush current, the output a of the ratio differential element 6 and the output b of the second-harmonic detection element 10 have waveforms of FIG. 9 which are the same as those illustrated in FIG. 6. Therefore, the monostable multivibrator 14 sends its pulse output e of a fixed width simultaneously with generation of the output a, so that the AND circuit 15 produces an output f and feeds the same via the OR circuit 17 to the AND circuit 11, thereby prohibiting transmission of the output c. When such a state is maintained continuously, the output c of the AND circuit 11 is on the verge of rising as indicated by a broken line at the moment the output f of the AND circuit 15 falls synchronously with the trailing edge of the pulse output e of the monostable multivibrator 14, but is actually prohibited from rising by the output g of the timing circuit 16 produced after the lapse of the preset time period T from the rise of the output b. Thus, as in the preceding example of FIG. 4, a malfunction is preventable in the example of FIG. 7 as well in spite of inflow of the transformer inrush current.

Although the second-harmonic detection element employed in the above embodiments is constituted of a fundamental-wave extraction circuit and a second-harmonic extraction circuit, it is to be understood that the constitution thereof is not limited to the example alone. Furthermore, in addition to the ratio differential relay with second harmonic suppression mentioned above, similar effect is also attainable when this invention is applied to a second harmonic detection type which is used for locking another relay through detection of a second harmonic component.

As described hereinabove, according to the present invention which is so composed as to clock and render effectual the output of the second-harmonic detection element only at the time of increase of the differential amount, it becomes possible to achieve remarkable advantages of enhancing the stability of the protective relay and ensuring high operational reliability thereof.

What is claimed is:

1. A protective relay with second harmonic suppression comprising:

a ratio differential element for comparing the amount of a differential current with the amount of a suppression current and producing an output signal when the amount of said differential current is greater than a predetermined value;

a second-harmonic detection element for detecting a second harmonic component in said differential current and producing an output signal when the content proportion of the second harmonic component is higher than a predetermined value;

a monostable multivibrator circuit operating in response to any amount of said differential current in excess of the predetermined value and producing an output signal for a preset period of time;

a first logic curcuit receptive of, as two inputs thereto, both the output of said monostable multivibrator circuit and the output of said second-harmonic detection element, and producing an output signal therefrom when said two inputs are received simultaneously;

a timing circuit for clocking the output duration of said second-harmonic detection element and producing a signal when said output duration reaches a predetermined period of time;

a second logic circuit receptive of, as two inputs thereto, both the output of said timing circuit and the output of said first logic circuit, and producing a second-harmonic suppression signal therefrom when at least one of said two inputs is received; and a third logic circuit receptive of, as two inputs thereto, both the second-harmonic suppression signal of said second logic circuit and the output of said ratio differential element, and serving to suppress the output of said ratio differential element when said second-harmonic suppression signal is received.

2. The protective relay as defined in claim 1, wherein said monostable multivibrator circuit is actuated by the output signal of said ratio differential element.

3. The protective relay as defined in claim 1, wherein said monostable multivibrator circuit is actuated by the output signal of a differential detection circuit which detects the amount of said differential current.

4. The protective relay as defined in claim 1, wherein the output pulse width of said monostable multivibrator circuit is set to be longer than the output duration of said second-harmonic detection element at the occurrence of a sudden reduction in the amount of said differential current input.

5. The protective relay as defined in claim 1, wherein the clock time period of said timing circuit is set to be longer than the output duration of said second-harmonic detection element at the occurrence of a sudden reduction in the amount of said differential current input and to be shorter than the output pulse width of said monostable multivibrator circuit.

6. The protective relay as defined in claim 1, wherein said first, second and third logic circuits consist of an AND circuit, an OR circuit and an inhibit circuit, respectively.

7. The protective relay as defined in claim 1, wherein said ratio differential element comprises a suppression circuit and a differential circuit receptive respectively of a suppression signal and a differential signal obtained in accordance with the current flowing in a device which is to be protected, and a comparator circuit for comparing the output signal of said suppression circuit with the output signal of said differential circuit.

8. The protective relay as defined in claim 7, wherein said second-harmonic detection element comprises a fundamental-wave extraction circuit receptive of the output of said differential circuit and extracting the fundamental wave component in said differential current input, a second-harmonic extraction circuit receptive of the output of said differential circuit and extracting the second harmonic component in said differential current input, and a comparator circuit for comparing the fundamental wave component and the second harmonic component with each other.

* * * * *

UNITED STATES PATENT AND TRADEMARK OFFICE
CERTIFICATE OF CORRECTION

PATENT NO. : 4,477,854

DATED : October 16, 1984

INVENTOR(S) : Masaji Usui and Akiyoshi Honma

It is certified that error appears in the above-identified patent and that said Letters Patent is hereby corrected as shown below:

On the cover page and at the top of column 1, in the title, "PORTECTIVE" should read --PROTECTIVE--.

Column 5, line 23, "monostab,le" should read --monostable--.

Signed and Sealed this

Twenty-eighth Day of May 1985

[SEAL]

Attest:

DONALD J. QUIGG

*Attesting Officer*     *Acting Commissioner of Patents and Trademarks*